March 20, 1934.   W. J. STILL   1,951,568
MANUFACTURE OF TUBES AND PARTICULARLY TUBES FOR HEAT TRANSFERENCE DEVICES
Filed June 18, 1930   7 Sheets-Sheet 1

Inventor
William Joseph Still
By B. Singer, Atty.

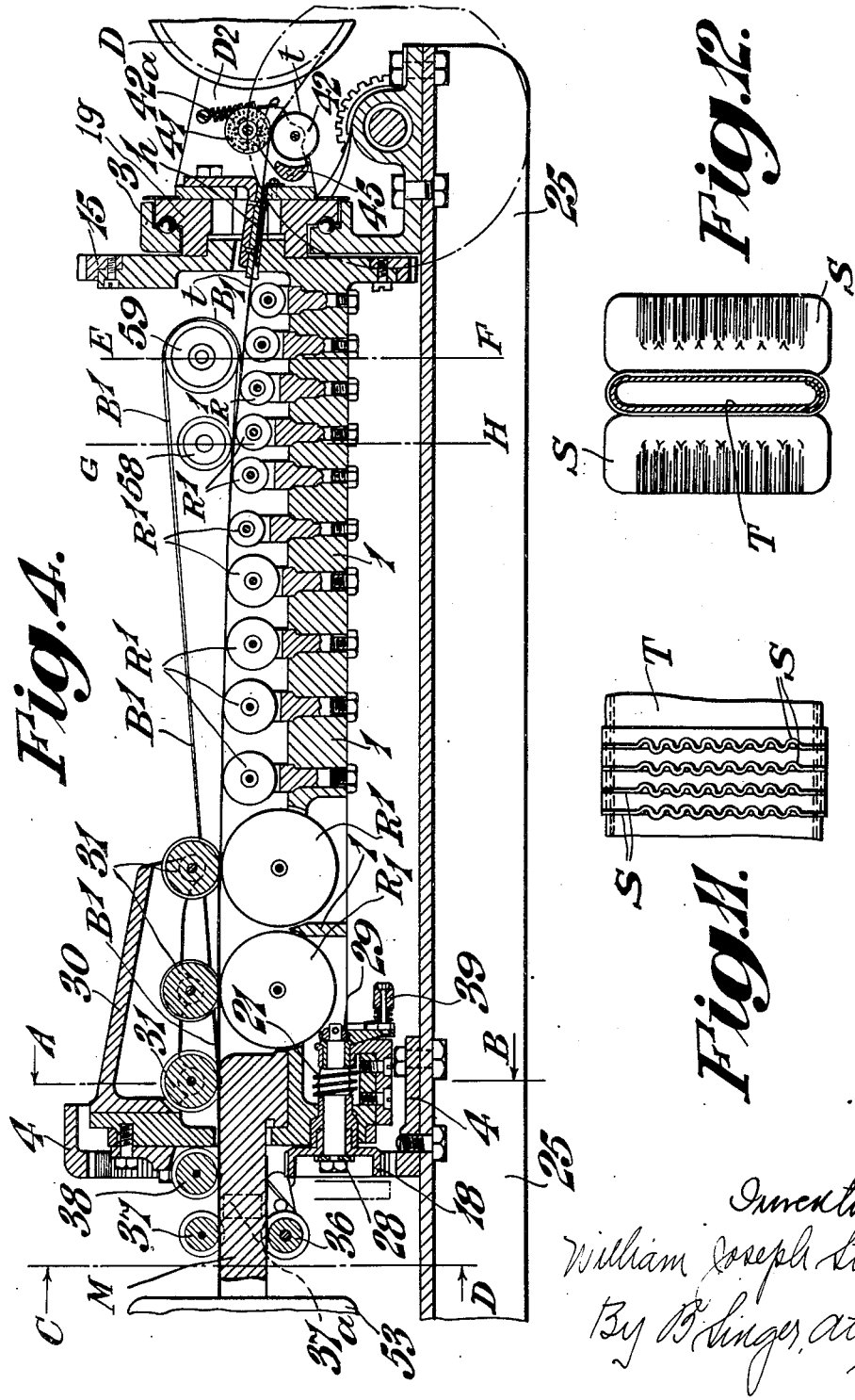

March 20, 1934. W. J. STILL 1,951,568
MANUFACTURE OF TUBES AND PARTICULARLY TUBES FOR HEAT TRANSFERENCE DEVICES
Filed June 18, 1930 7 Sheets-Sheet 5

Inventor
William Joseph Still
By B. Singer, Atty.

Inventor
William J. Still
by B. Singer Atty.

March 20, 1934.   W. J. STILL   1,951,568
MANUFACTURE OF TUBES AND PARTICULARLY TUBES FOR HEAT TRANSFERENCE DEVICES
Filed June 18, 1930   7 Sheets-Sheet 7

Inventor
William Joseph Still
By B. Singer, Atty.

Patented Mar. 20, 1934

1,951,568

UNITED STATES PATENT OFFICE 1,951,568

MANUFACTURE OF TUBES AND PARTICULARLY TUBES FOR HEAT TRANSFERENCE DEVICES

William Joseph Still, London, England

Application June 18, 1930, Serial No. 462,094
In Great Britain June 18, 1929

9 Claims. (Cl. 113—1)

This invention relates to the manufacture of tubes and particularly tubes for heat interchange devices.

The invention comprises a method of forming a tube for heat transmitting and other purposes, consisting in bending a strip of sheet metal until its edges meet or overlap to form a tube of the desired section, then winding on the tube spirally a wire, strip or ribbon then separately or simultaneously soldering or uniting the meeting edges of the tube together and also the spiral wire or strip or ribbon on the tube.

The edges or surfaces to be united are preferably coated with solder previous to the formation process and the assembled parts heated to cause the soldered parts to unite, and when it is desired that the edges of the consecutive windings of the strip shall abut against each other they are previously soldered.

A tube can therefore be made in accordance with this invention having inner and outer portions soldered together, the inner portion being made of thin sheet metal of which the edges are soldered together to make a longitudinal joint, while the outer portion of the tube is constructed of a spirally wound strip soldered on to the inner tube, and the edges of the consecutive windings of the strip may be arranged to abut and be soldered together.

The inner and outer elements may be of the same or different metals, for instance, the inner element of the tube may consist of a tubular portion of copper or brass or other suitable non-corrosive metal, and the outer element a spiral winding of hoop iron.

The winding strip may be of angular cross section comprising a flange and web, the flange being the portion soldered on to the inner tube, while the web forms a gill on the tube, and this web or gill may be cut away or interrupted at intervals and the portions between the interruptions corrugated or embossed.

The tube—especially for use in radiators—is preferably of flat or oval cross section or with flat sides slightly curved outwards, and in such a construction of tube the cut away portion of the web of the winding strip may be arranged at the narrow ends of the flat or oval cross section of the tube.

A further feature of the invention comprises a machine wherein the sheet strip of metal is passed through tube-forming rollers or formers to curve its edges over to form a tube of the desired cross section, and while the tube is passing further through the machine it is rotated to receive the winding strip or ribbon fed on to it.

The section of the machine for forming the inner tube element preferably comprises means for feeding the strip through a flanging device to form flanges along each of its sides and then feed it centrally over a series of narrow forming or feed rollers against the opposite sides of which the strip is gradually folded by means of belts carried by a series of guide rollers of which the axes from one end roller to the other are gradually inclined through approximately 90 degrees, so as to bring the strip into tubular form. Further feeding of the strip carries it on to a flat sided mandril, or a mandril of any other desired shape, at the bottom edge of which the two edges of the strip are folded over each other and the tube passed through a muffle rotating at the same speed as the tube forming section of the machine. The muffle melts the solder on the contacting surfaces and so unites them before they are fed through a cooling device and then through a device which cuts the tube off into the desired lengths.

The various features of the invention are illustrated by the accompanying drawings wherein:

Fig. 2a is a modification of the apparatus shown in Figure 2.

Figure 4 is a general sectional elevation on line X—X of Figure 1.

Figures 11 and 12 are side and end views of a portion of a flat sided tube made on the machine, and showing flanged radiating fins arranged to strengthen the tube.

Figure 1:
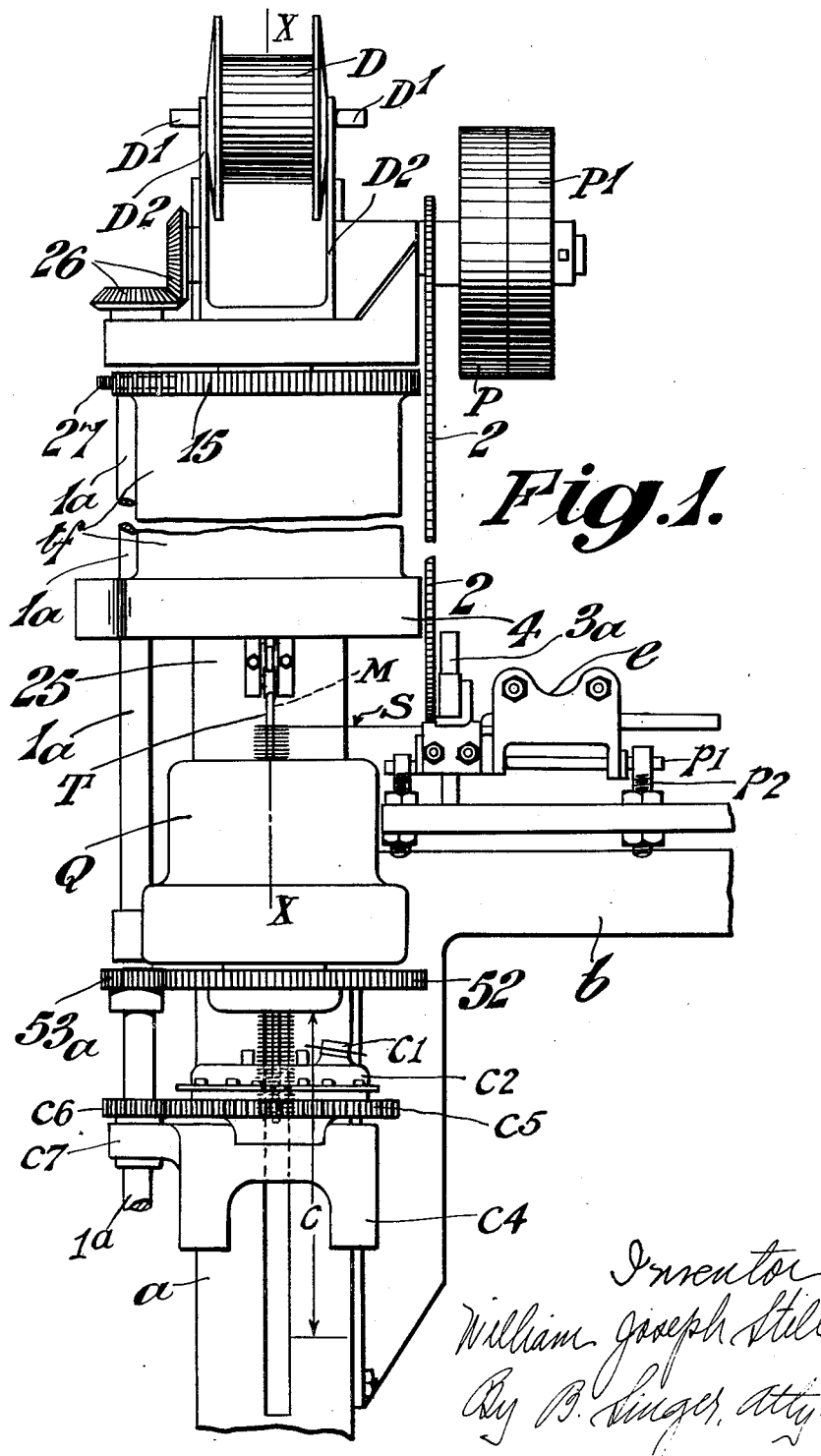
Figure 1 is a general diagrammatic elevation of the complete machine.

In Figure 1 of these drawings $a$ is the main standard of the machine its lower end being provided with a suitable supporting base. On a bracket $b$ secured to the standard $a$ is fixed a portion of the machine which prepares the gill strip of the tube. This portion of the machine comprises a strip punching and corrugating section $e$. The strip which is indicated by S passes from the strip treating portion of the machine on to a tube T formed on a narrow or flat sided mandril M. The tube T passes from a tube forming portion $tf$ of the machine into a muffle portion Q and from there to a cutting off section $c4$ of the machine. A strip $t$ from which the tube T is formed is fed from a drum or spool D, and the tube forming portion $tf$ of the machine, which has a central portion 1 on which are mounted the support $R2$ of rollers or pulleys $R1$, see Fig. 4, is rotated from a power pulley P, by the side of which is arranged a loose pulley P1 in the usual manner. The shaft of the pulley P drives through bevel gears 26 a shaft $1a$ on which is fixed a pinion 27 which drives a spur wheel 15 fixed on the rotary portion of the tube forming section of the machine.

The muffle Q is rotated by a spur wheel 52 secured thereon and in gear with a pinion $53a$ fixed on the shaft $1a$.

Figure 2:
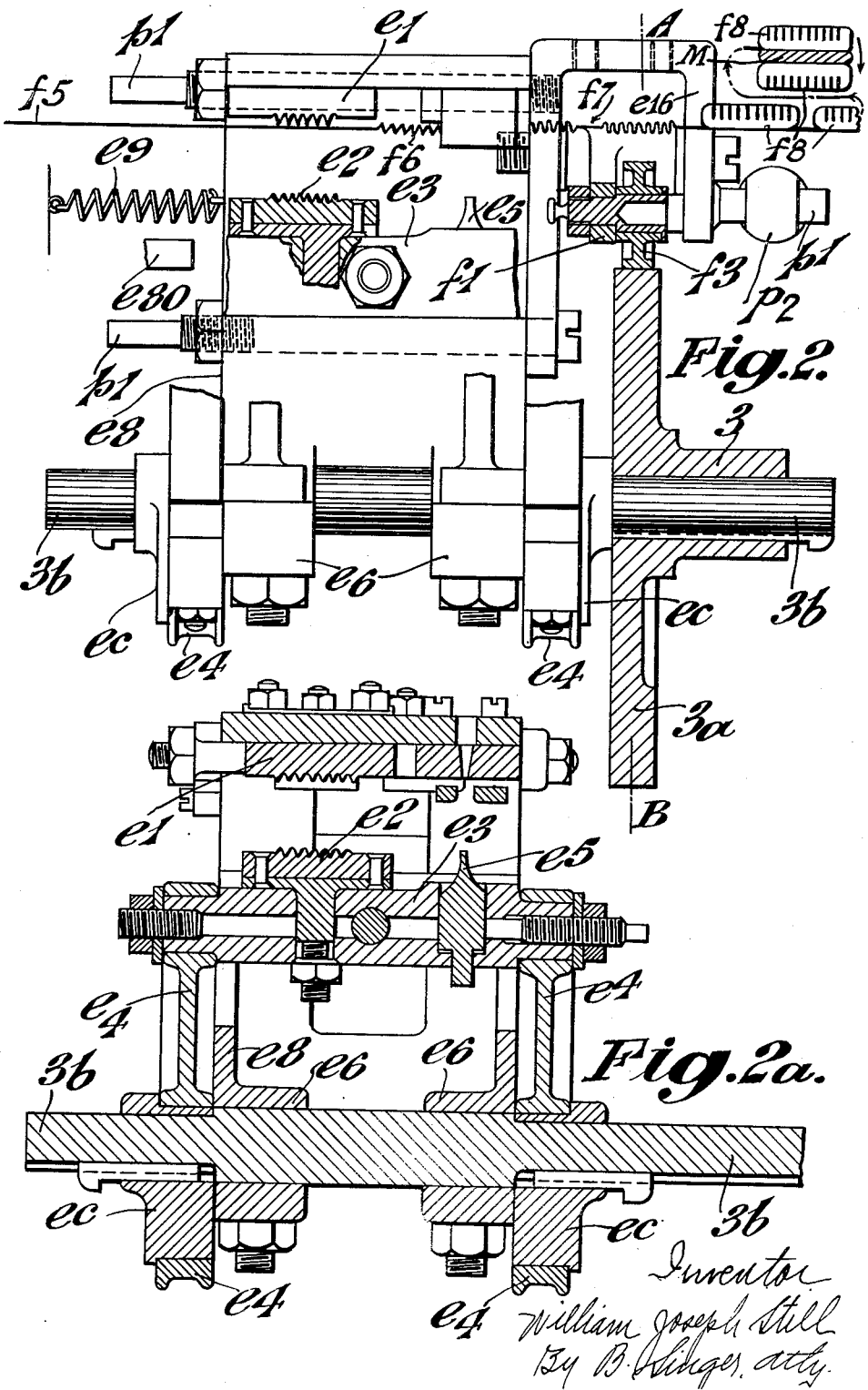
Figure 2 is a partial sectional view of a portion of the machine for corrugating, punching and flanging the gill strip to be wound round the tube.
Figure 3:
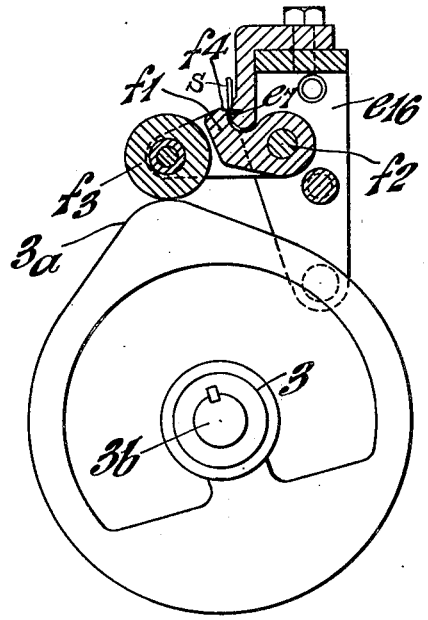
Figure 3 is a section on A—B of Figure 2.

In the gill strip treating portion of the machine the gill strip after being soldered along the portion thereof which is to form a flange portion of the strip to be soldered on the tube T passes into the corrugating, punching and flanging portion $e$ of the machine shown in detail in Figure 2 and driven by a chain 2 driven by the pulley P. The chain 2 passes round a chain wheel mounted on the boss 3 of a cam $3a$ fixed on a driving shaft $3b$ of this portion of the machine. The gill strip S entering this section of the machine passes between fixed and movable corrugating dies $e1$ and $e2$. The movable dies $e2$ are operated by a slide $e3$ moved to and from the fixed die $e1$ by connecting rods $e4$, $e4$ operated from eccentrics on the shaft $3b$. The shaft $3b$ is mounted in bearings $e6$ in the framing $e8$ of the machine, and the slide $e3$ also carries a punch $e5$ which punches out portions of the strip S arranged at regular intervals along the strip at distances apart corresponding to the greater dimension of the tube T.

At one end of the standard of this portion of the machine is fixed a bracket $e16$ which carries a strip flanging lever $f1$ mounted on a shaft $f2$ and carrying an operating roller $f3$ which is held against the operating edge of the cam $3a$ by a spring not shown in the drawings. As the strip S passes along a slot $e7$ of the bracket $e16$ it is flanged by the flanging portion $f4$ of the lever $f1$ which is periodically moved towards $e7$ by the cam $3a$.

The strip S after leaving the flanging lever $f1$ passes to the mandril M and the distance of the corrugating and punching mechanism from the mandril M is adjusted by mounting the framing $e8$ on rods $p1$, $p1$ and mounting these rods to slide in stationary bearing members fixed to the main frame of the machine each similar to $p2$.

The operation of the punch $e5$ takes place during a very small segment of the revolution of the cranks on the shaft $3b$ and is timed to occur when the mandril M rotated by the winding head is almost in line with the strip S which is being wound on to it.

The principle referred to forms the basis of the operation of winding and entails the following:—

1. The speed at which the strip passes to the winding mandril M and wraps around the mandril on the line C—D, see Fig. 4, is at its maximum when the mandril is at right-angles with the strip S and at a minimum when it is in line with it.

2. Advantage is taken of the slow speed at which it moves at the minimum speed point and the punches are timed to stamp out the slit, corrugate the gill and flange at a definite position near this point.

3. Any motion of the strip during the process of punching is compensated for by allowing the punching machine to slide towards the winding head on the rods $p1$ on which it is mounted and which slide the bearings $p2$, as shown in Figure 2, as soon as the punches release themselves from the strip the punching machine slides back to a stop $e80$ by the control of a spring $e9$, and is thus ready for the next punching stroke. It is to be understood that the whole of the punching frame $e$, together with the cam and all the other parts carried thereby, is free to travel towards the winding mandril M, this being made possible by reason of the cam shaft $3b$ being driven by a sprocket chain 2 (see Figure 1) of considerable length, and will therefore readily allow of such movement, this movement being quite small, approximately $\frac{1}{16}$th inch from the mean position, and the movement of the punching frame which is being pulled towards the mandril M by the rotation of the mandril is during punching and corrugating very small, as the effective radius of operation of the mandril is then only one half the thickness of the mandril.

4. The punching machine shaft may be arranged to run at 200 R. P. M. and the winding head at 100 R. P. M. and they are geared together so that two slits are punched in the hoop iron as it passes to the winding mandril for each revolution it makes.

5. By adjusting the stop the position at which the slit is punched in the strip S can be regulated so that it shall wind on at the edge of the mandril, it being necessary that when the mandril is flat with the strip a convenient but exact number of gill spaces shall be between it and the slit then being made.

6. The position of the slit relative to the mandril edge is thus determined by the distance the punching frame is from the mandril when it reaches a certain rotational position and the true position of the slit is therefore determined anew at each half revolution of the winding edge so that no cumulative error can be made.

The tube forming portion of the machine is illustrated by Figure 1 and Figures 4 to 8.

At the upper end of the machine is situated a spool D of brass strip $t$ tinned on one side and this passes first between two guide rollers 41 and 42 and then through a guide $h$ which slightly turns or bends over the edges and correctly positions it into the space between upper and lower feed belts B1 and B2, which feeds the strip $t$ through the tube forming part of the machine.

Figure 5:
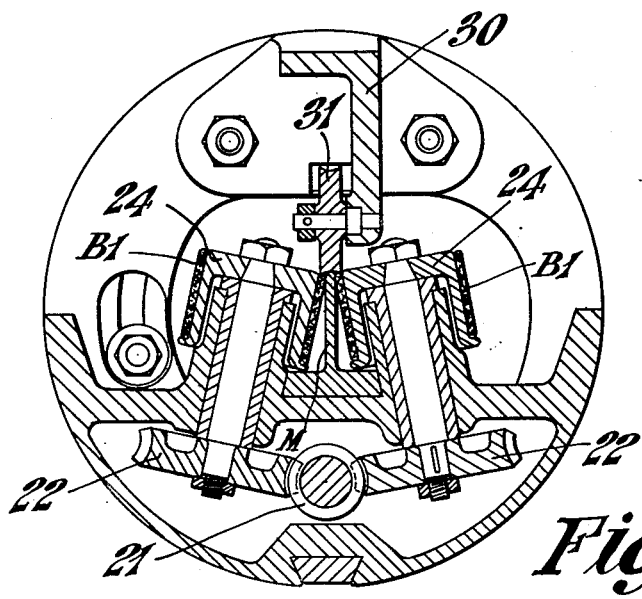
Figure 5 is a section on A—B of Figure 4.
Figure 7:
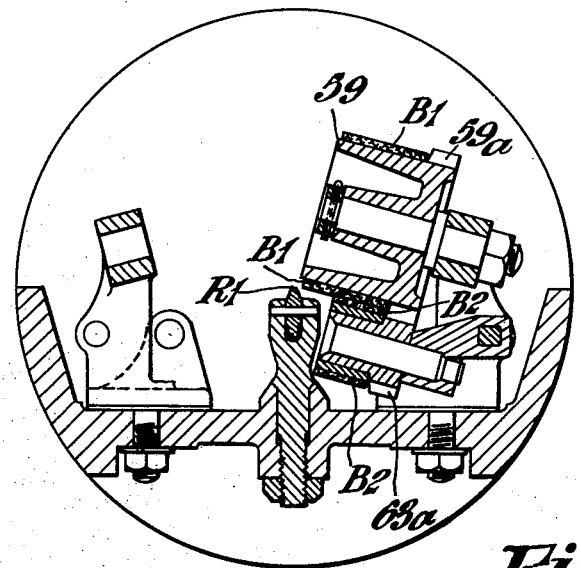
Figure 7 is a section on E—F of Figure 4.
Figure 8:
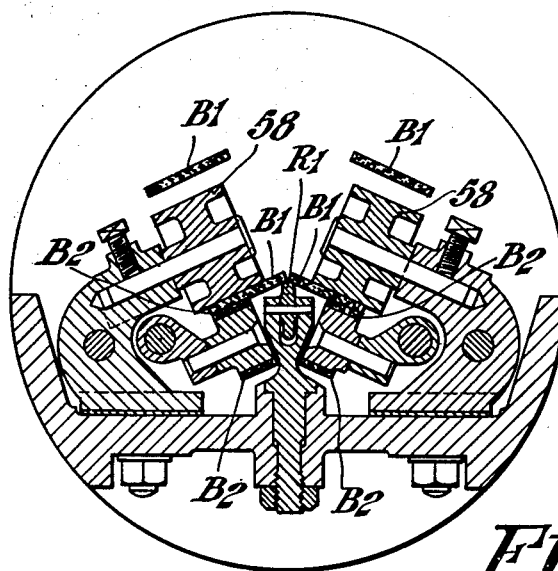
Figure 8 is a section on G—H of Figure 4.

The upper rubber belts B1, B1 are strained between the pulleys 24 and 59 and twist from the position shown on Figure 7 to that shown on Figure 5.

The upper endless belts B1, B1 are arranged in parallel over the respective halves of the strip $t$ and to form twists in opposite directions, so that while pressing and feeding the strip $t$ on the forming rollers R1, they gradually curve the edges of the strip in opposite directions over opposite sides of the mandril M.

The brass strip $t$ is thus drawn in under the strip feeding belts B1, B1 over the long row of narrow rollers R1, R1 and bent down on each side of them progressively by the belts B1, B1 thus ensuring a continuous process which avoids any sudden distortion of the material and thus prevents stretching or buckling it, an evil that easily arises. This continuous increasing constraint of the belts B1, will be evident from Figures 7, 8 and 5, which represent sections at three different places along the axis of the machine, see Figure 4. Figure 7 shows the belt angle at the top end of the belt that is at E—F, Figure 4, while Figure 5 indicates the belt angle at the bottom end of the belt, that is at A—B, Figure 4, and it is evident that between these two points the belt is twisted through an angle of approximately 80°, the brass strip which lies against the inner face of the belt is therefore continuously bent over at a corresponding angle gradually by the belt over the edges of the longitudinal series of rollers R1.

In order to obtain a definite drive such as shall give the required pitch to the spiral of the strip S wound on to the mandril M a pair of short and narrow belts B2, B2 (see Figures 7 and 8) are pressed to the under side of the rollers 58 and 59 and the driving roller of the under belt is geared to roller 59 by toothed wheels 63a and 59a (see Figure 7). This provides a real grip on the tube forming strip $t$ and ensures that its movement shall be regular; the vertical speed at which the strip, in its closed up form, issues as tube from the mandril M is controlled by the worm 21, worm wheels 22, (see Figures 5 and 6) gear 18, pinion 17, gear 16, pinions 8 to 7 which meshes with the internal gear 4. Some of these gears may be made as interchangeable change speed gears.

This train of gears provides that a definite amount of tube shall pass off the mandril M for each revolution thereof and for entrance purposes a ratchet and handle 28, 29, and 39 are provided to feed the strip in when a new spool is inserted.

Figure 10:
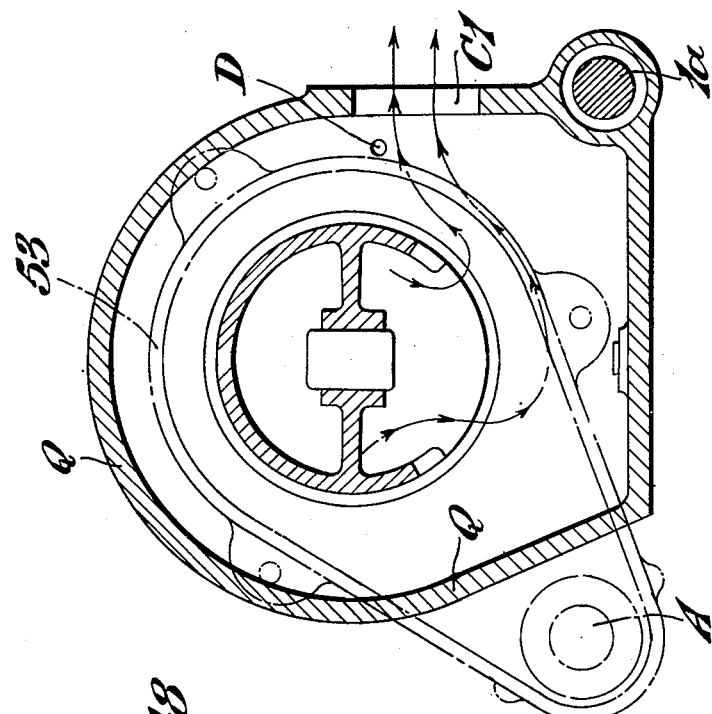
Figure 10 is a section through A—B of Figure 9.
Figure 9:
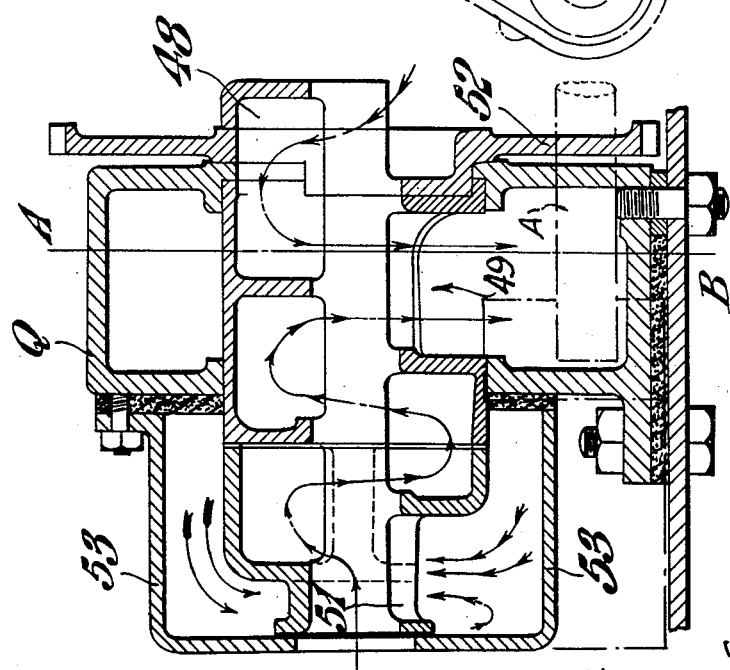
Figure 9 is a longitudinal section of the muffle portion of the machine.

The soldered part of the gill strip S is united to the soldered surface of the tube T during its passage through a muffle Q. See Figs. 9 and 10.

The muffle Q also cools the tube to a point where the solder is again solid and the tube may be cut off to length and dropped onto a moving belt with safety.

The arrangement comprises a gas burner A of the ordinary Bunsen type located within an annular chamber 49 into the open lunar shaped passage 51 at the edge of which the hot gases enter as indicated by the arrows, and pass around the gilled tube and then pass up into the body of this inverted pot like structure and pass around the passage 51 and thence as indicated into the chamber 49 and out to an induced draught fan through the opening C1 in the cooling chamber 48.

The axial passages through the chambers 53 and 48 are made to fit the sides of the tube which has been wound with the gill strip, so as to force the gases to pass over the gills of the tube in close contact with them, and because they so fit they have to revolve with the tube and the gear 52 ensures that these parts keep in line with the tube, the gear being driven by the pinion 53a shown on Figure 1.

As shown the two streams of gases pass through the muffle one being hot gases from the burner which flow (mainly) downwards and one being cool air which flows upwards: This is not of course the natural method of circulation but the rate of movement required is far above that obtainable with natural circulation and the pull of the fan will be practically unaffected by the tendency to reverse the flow.

The hottest gases are first brought into contact with the cool tube because a high temperature difference may be then safely used, when the tube has been heated up the gas temperature must not be made too great or the solder will be overheated, the use of a thermostatic regulator at the upper part of the exit may be advisable to control the temperature of the gases leaving the top duct, it being arranged to control a valve on the gas burner.

Below the muffle Q is a cutting off saw $c1$ driven by a rotating member $c5$ mounted on a slide $c4$ which is able to slide down the bed in the direction of the issuing tube. The rotating member $c5$ is a toothed wheel carried by a body member $c2$ and driven by a pinion $c6$ sliding on the rod $1a$. The pinion $c6$ is supported and located by a lug $c7$ of the frame $c4$. The method of cutting may be by a saw or by a high speed slitting emery wheel driven by a power shaft A full spool D of brass strip tinned with solder on one side is inserted at the upper end of the machine by resting the shaft D1 on which it revolves in the bracket D2 provided for it, the ends of the shaft serve as handles for this operation (see Figure 1). The bracket D2 is fixed to the ring $1g$ which is bolted to the revolving frame 1.

The end of the strip is cut to form a spear shaped end and this is inserted between the rubber roller 41 and the metal roller 42 which is pressed against it by a spring 42a pulling on a lever 45 carrying the shaft of the pulley 42. The roller 41 is provided with a knurled head on its shaft and by this means the roller is turned and the strip fed into the flat guide $h$ which curls or bends the edge of the strip downwards and at the same time guides it into the correct sideways position for engagement with the rolls R1.

As soon as the strip enters under the feed rollers and between the two belts B1 and B2 it can be fed forward by a ratchet action operated by a handle 39 (see Figure 4). This ratchet operates the feed in the same manner as it will be operated later when the whole head carrying the tube forming elements and the muffle revolves, and by swinging this handle to and fro the strip will be made to pass under the belt B1 and over the various rollers R1 until it passes over the mandrel M and so emerges from the face of the machine.

The strip passing from the roller R1 is folded under the mandrel M and the edges closed by means of a forming die 54b pivoted on a pin 54c and having two arms 54d and 54e at an angle to one another. The arm 54d is grooved or shaped at 54f so as to guide the two edges of the strip and fold them one over the other. The other arm 54e engages an adjustable stop 54g against which it is held by a spring 54h.

Figure 6:
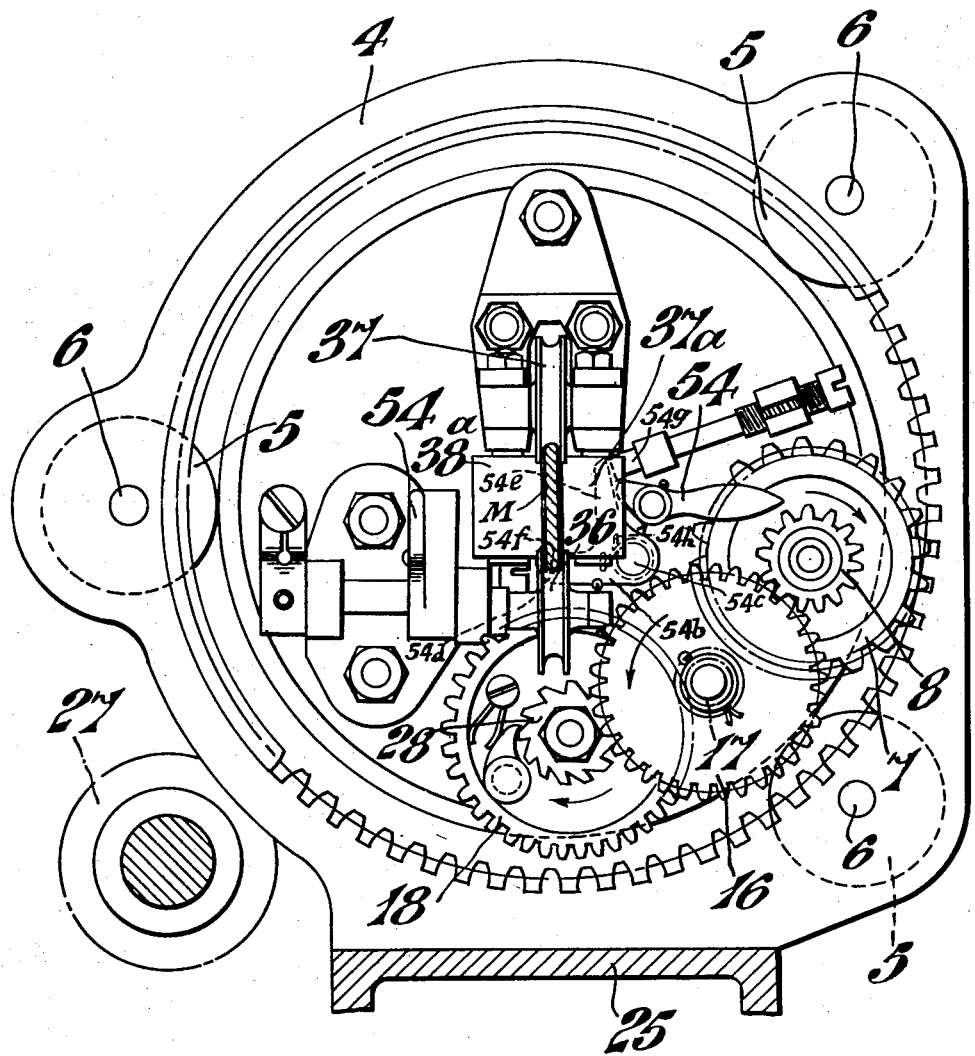
Figure 6 is a section on C—D of Figure 4.

In order to assist in feeding the strip through the machine when a new roll is inserted, two release handles are provided on the front of the machine, namely 54 and 54a (see Figure 6). By moving handle 54 in clockwise direction the guide plates which fold over the bottom of the strip on the right hand side is moved away from the mandrel and by pulling handle 54a downwards roller 36 is depressed so that the strip can pass readily along the mandrel until it issues below the adjacent roller. The lever 54 can now be returned to its initial position, a little more strip fed through the machine and the handle 54 released, which will complete the folding. The machine will then be loaded with a brass strip and ready to commence winding operations.

To commence winding on the tube a metal gill strip which is preferably narrow, say ½ inch wide, the lower edge of which has been tinned on one side with solder, the strip is drawn from a spool into the punching frame e, and pushed through this frame by hand until it emerges at the other side and it can then be hooked around the mandrel M of the main head.

In order to facilitate this the first foot of the gill strip should have its upper or gill portion cut away so as to leave the ribbon or flange portion, say ⅛" wide only on its lower edge. As soon as this has been hooked around the mandrel M, approximately on the line C, D, Figure 4, the shaft 1a can be started in motion by means of the pulleys P, P1, on the driving shaft 46 and the pull of the rotating mandrel will suffice to draw the gill strip through the punching frame and wind it upon the mandrel, whilst at the same time the brass strip which is wrapped around the mandrel M is forced downwards by the action of the feed belts B1, B2 between which it runs. The effect of the operations is to fold upon the mandrel an inner envelope upon which is wound a spiral envelope formed by the gill strip flange, the abutting surfaces being already coated with solder. As before described, the gill strip in passing through the punching frame is corrugated, slit and flanged, so that it is in a suitable state to wind upon the mandrel and produce a tube having horizontal gills the bases of which are flanged and abut closely on each other. This tube descends from the line C, D, into muffle Q in which it is heated by the passage of hot gases over the gill surfaces from the gas burner A (see Figures 9 and 10). This heating is continuous until the solder on the abutting surfaces has melted, at which point the tube encounters the stream of cold air which solidifies the solder and leaves the tube in a condition in which it may be safely cut off to the desired length either by means of a saw or of a slitting wheel.

Rollers 31 are provided at the back of the end narrow rollers R1, in order to prevent the strip from rising out of contact with the rollers R1 and further rollers 38 and 37 are employed above the mandril M for the same purpose, whilst side rollers 37a and 38a are provided at the sides of the mandril so as to ensure that the tube shall be flat sided when its lower edge is in closed position.

The whole of the machine is supported on a channel frame 25 and the main parts rotate in bearing 3 upon which it is hung, the lower end of the rotor being steadied by the frame 4 which forms the internal gear. The path of the rotor is guided by 3 guide rollers 5.

The rotor is rotated by means of driving pinion 27 and gear 15. The muffle in which the tube is heated is also rotated in a similar manner by the pinion 53a and gear 52, this being necessary because there are passages in the muffle Q which substantially fit the rectangular tube externally.

The same shaft 1a also revolves the cut-off gear for this must turn in unison with the winding head during the sawing off process, because sawing can only be effected if the stroke of the saw teeth is in line with the wall of the tube so that the cut is resisted by the width of the tube on edge and this cannot be accomplished if the tube is revolving underneath the saw during the cutting process.

In the above description of the tube forming machine with reference to Figure 4, before the overlapping folded edges of the tube pass on to the roller 36 such edges are pressed against each other and the mandril by means of the former 54b which as described above comprises a spring-pressed lever normally exerting pressure in the direction of the mandril.

What I claim and desire to secure by Letters Patent is:—

1. A machine for making heat transmission tubes having a spirally wound gill thereon from two separate strips of sheet metal, comprising means for feeding forward and forming a tube from one strip of metal, means for rotating the tube to wind the second strip of metal transversely on the tube as it passes from the forming apparatus to form a spiral gill thereon, and means for securing the formed spiral gill on the tube.

2. A machine for making heat transmission tubes having a spirally wound gill thereon from two separate strips of sheet metal, comprising means for feeding forward and forming a tube from one strip of metal, a tube forming mandril, means for rotating the formed tube and gill strip corrugating, punching and flanging devices, the tube from the tube forming apparatus being delivered on to the mandril and together therewith rotated to spirally wind the gill forming strip on the tube, the gill forming strip being drawn on its way to the tube through the corrugating, punching and flanging apparatus, and the punching being effected at intervals along the flanged strip.

3. A machine for making heat transmission tubes of flat cross section and having a spirally wound gill thereon from two separate strips of sheet metal, comprising tube forming and feeding apparatus, a tube forming mandril of flat cross section, means for rotating the tube and strip, corrugating, punching and flanging devices, the tube from the tube forming apparatus being delivered on to the mandril and together therewith rotated to spirally wind the gill forming strip on the tube, the gill forming strip being drawn by the rotating mandril on its way to the tube through the corrugating, punching and flanging apparatus, and the punching effected at intervals along the flanged strip and the punching apparatus being arranged at such a distance from the mandril as to ensure the punched portions being located at the narrow sides of the tubes.

4. A machine for making a heat transmitting tube from a strip of metal, comprising a strip edge bending device, a longitudinal series of narrow rollers, a tube forming mandril, means for feeding the strip through the edge bending device, means for folding the bent edges of the strip over each other on the opposite edge of the mandril, two power driven endless feeding belts engaging opposite halves of the strip and feeding it over the rollers on to the tube forming mandril, two series of pulleys each carrying one of the endless belts, the pulleys being inclined at progressively increasing angles to gradually twist the belt and the strip fed thereby and fold the opposite edges of the strip towards each other over the series of rollers until they engage the opposite sides of the mandril and the bent edges thereof pass over each other on the opposite edge of the mandril.

5. A machine for making heat transmission tubes having a spirally wound gill thereon from two separate strips of tinned sheet metal, comprising tube forming and feeding apparatus for feeding forward and forming a tube from one strip of metal, a muffle and means for rotating the tube while it is being fed forward by the forming means, to wind the second strip thereon to form a spiral gill, the muffle rotating with the tube and melting the solder to secure the formed spiral gill on the tube.

6. A machine for making a tube having a radiating gill from thin strips of metal comprising a longitudinal series of tube forming rollers, means for moving over the series of rollers one of the strips of metal, means for maintaining the strip in intimate contact with the series of rollers and at the same time progressively curving over the edges of the strip to form a tube, means for flanging and punching out sections from another of the strips of metal, means operative to rotate the formed tube and wind the flanged and punched web spirally on to the tube.

7. A machine for making a tube having a radiating gill from two thin strips of metal, comprising means for continuously feeding forward a length of metal strip, a guide for slightly bending or turning over the edges of the strip while it is being fed forward, a series of tube forming rollers along which the strip is fed, two pairs of power driven endless belts connected together by gearing and feeding forward the strip over said rollers, one pair of endless belts being arranged to engage the strip and gradually curve the edges thereof laterally over the tube forming rollers, a mandril on which the formed tube is fed, a stationary former and cooperating member for longitudinally flanging the second strip, a power operated punch for punching out portions of the gill forming web at regular intervals and a pair of power operated dies for corrugating the web so formed, gears for rotating the tube and tube forming mechanism whereby the flanged gill forming web is wound spirally on to the formed tube and drawn through the flanging, punching and perforating mechanism.

8. A machine for making a tube having a radiating gill from tinned strips of metal one a tube forming strip and the other a gill forming strip, comprising in combination a series of tube forming rollers, two power driven endless belts each arranged over one half of the strip and engaging and feeding the strip over and along the series of tube forming rollers, the endless belts being twisted to gradually curve the edges of the strip laterally in opposite directions over the tube forming rollers, a guide for slightly bending or turning over the edges of the tube forming strip while being fed forward over and along the series of tube forming rollers, a mandril receiving the formed tube fed from the tube forming rollers, means for rotating the tube forming portion of the machine together with the formed tube, gill strip flanging apparatus through which the gill forming strip is drawn while being wound on the formed tube passing along the mandril, a muffle arranged coaxially with the tube forming apparatus and rotatable therewith and through which the fed tube passes so that the engaging portions of the tinned strips are sweated after passing from the mandril.

9. A machine for making a tube having a radiating gill from thin strips of metal, comprising strip feeding devices for continuously feeding forward a length of the metal strip, a guide for slightly turning over the opposite edges of the fed strip while the strip is being fed forward, a series of belt carrying pulleys, a pair of obliquely mounted pulleys arranged at one end of the series of belt carrying pulleys, and a pair of horizontally mounted pulleys at the other end of said series, and a pair of power driven belts stretched between and driven by said pulleys and held against the strip of metal by the intermediate pulleys of the series so as to gradually curve the strip of metal over the tube forming rollers, a tube forming mandril on to which the tube passes from the rollers, a plurality of rollers contacting with the fed metallic strip and pressing the same on to the mandril so as to form a closed tube, means for rotating the tube and for feeding it longitudinally, and gears for rotating the tube together with the tube forming mechanism as it moves longitudinally whereby a flanged strip of metal of which the end is fixed to the tube is spirally wound on the formed tube.

WILLIAM JOSEPH STILL.